United States Patent
Kishi et al.

(10) Patent No.: US 9,994,281 B2
(45) Date of Patent: Jun. 12, 2018

(54) HANDLE POSITION-ADJUSTMENT STRUCTURE OF STRADDLE TYPE VEHICLE

(71) Applicant: HONDA MOTOR CO., LTD., Tokyo (JP)

(72) Inventors: Toshiaki Kishi, Wako (JP); Dai Takakuwa, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 9 days.

(21) Appl. No.: 15/193,418

(22) Filed: Jun. 27, 2016

(65) Prior Publication Data

US 2017/0001678 A1   Jan. 5, 2017

(30) Foreign Application Priority Data

Jun. 30, 2015 (JP) .................................. 2015-131292

(51) Int. Cl.
| | |
|---|---|
| B62K 21/16 | (2006.01) |
| B62K 21/22 | (2006.01) |
| B62K 21/02 | (2006.01) |
| B62K 21/04 | (2006.01) |
| B62K 21/12 | (2006.01) |

(52) U.S. Cl.
CPC .............. B62K 21/16 (2013.01); B62K 21/02 (2013.01); B62K 21/04 (2013.01); B62K 21/125 (2013.01); B62K 21/22 (2013.01)

(58) Field of Classification Search
CPC ........ B62K 21/16; B62K 21/02; B62K 21/04; B62K 21/125; B62K 21/22
See application file for complete search history.

(56) References Cited

U.S. PATENT DOCUMENTS

| | | | | | |
|---|---|---|---|---|---|
| 4,023,436 | A | * | 5/1977 | Dodge | B62K 21/16 74/551.3 |
| 8,029,011 | B2 | * | 10/2011 | King | B62K 11/14 280/279 |
| 2016/0339982 | A1 | * | 11/2016 | Wakimoto | B62K 21/02 |

FOREIGN PATENT DOCUMENTS

| | | |
|---|---|---|
| JP | S5293035 A | 8/1977 |
| JP | H0196395 U | 6/1989 |
| JP | H03208786 A | 9/1991 |
| JP | 2009-274564 A | 11/2009 |

* cited by examiner

Primary Examiner — Tony H Winner
Assistant Examiner — Marlon A Arce
(74) Attorney, Agent, or Firm — Birch, Stewart, Kolasch & Birch, LLP

(57) ABSTRACT

A handle position-adjustment structure of a straddle type vehicle for improving maintainability improving the appearance of the vehicle. A handle position-adjustment structure of a straddle type vehicle includes a top bridge having fork insertion holes into which a right and left pair of front forks are inserted, and connecting the right and left pair of front forks with each other; a right and left pair of handle holders arranged below the fork insertion holes, and having cylinder portions inserted into the front forks in such a manner so as to be rotatable around axes of the front forks; and an adjustment hole allowing adjustment of the position of the handle holder. The position of the handle holder is adjustable by a position adjustment bolt inserted into the adjustment hole and the top bridge. The position adjustment bolt is oriented in a direction perpendicular to the axis of the front fork.

19 Claims, 11 Drawing Sheets

HANDLE POSITION-ADJUSTMENT STRUCTURE OF STRADDLE TYPE VEHICLE

CROSS-REFERENCE TO RELATED APPLICATIONS

The present application claims priority under 35 USC 119 to Japanese Patent Application No. 2015-131292 filed Jun. 30, 2015 the entire contents of which are hereby incorporated by reference.

BACKGROUND OF THE INVENTION

1. Field of the Invention

The present invention relates to a handle position-adjustment structure of a straddle type vehicle.

2. Description of Background Art

Heretofore, a handle position-adjustment structure of a straddle type vehicle is known that includes a long hole provided on a top face of a top bridge of a steering device; a fixing member (fixing bolt) inserted into the long hole from above and a handle to which the above fixing member is fastened below the top bridge wherein the handle position is adjustable by loosening the fixing member, and rotating the handle around the front fork. See, for example, Japanese Patent Application Publication No. 2009-274564.

However, since the long hole is provided on the top face of the top bridge in the above conventional handle position-adjustment structure, rainwater tends to enter from the long hole. In addition, since a stepped part is provided, rainwater tends to pool inside the long hole, and the fixing member is sometimes bonded due to the influence of rainwater. This leads to a problem in maintainability. In addition, when arranging the handle position-adjustment structure, including the fixing member in consideration of the maintainability, it is desirable that any influence on the appearance of the vehicle be avoided.

SUMMARY AND OBJECTS OF THE INVENTION

The present invention has been made in view of the foregoing, and aims to provide a handle position-adjustment structure of a straddle type vehicle, which can improve the maintainability and also improve the appearance of the vehicle.

To achieve the above objective, an embodiment of the present invention is a handle position-adjustment structure of a straddle type vehicle that including a right and left pair of front forks (26) arranged on both sides of a front wheel (2), and supporting the front wheel (2); a top bridge (27, 227) including insertion holes (33) into which the right and left pair of front forks (26) are inserted, and connecting the right and left pair of front forks (26) with each other; a right and left pair of handle holders (40) arranged above or below the insertion holes (33), and having a cylinder portion (42) inserted into the front fork (26) in such a manner as to be rotatable around an axis (26a) of the front fork (26) and an adjustment hole (48a, 48b, 48c, 148, 248a, 248b, 248c) allowing adjustment of a position of the handle holder (40), wherein the position of the handle holder (40) is adjustable by a fixing member (38, 138, 238), which is inserted into the adjustment hole (48a, 48b, 48c, 148, 248a, 248b, 248c) and any one of the top bridge (27, 227) and the handle holder (40) and the fixing member (38, 138, 238) is oriented in a direction perpendicular to the axis (26a) of the front fork (26).

According to an embodiment of the present invention, the position of the handle holder is adjustable by the fixing member, which is inserted into the adjustment hole allowing adjustment of the position of the handle holder, and the top bridge or handle holder; and the fixing member is oriented in the direction perpendicular to the axis of the front fork. Since the fixing member is oriented not in the direction of the axis of the front fork, but in the direction perpendicular to the axis, rainwater is less likely to enter the adjustment hole into which the fixing member is inserted. Thus, bonding of the fixing member can be avoided, and the maintainability can be improved. In addition, since the fixing member is oriented in a direction perpendicular to the axis of the front fork, and is less recognizable, the appearance of the vehicle can be improved.

According to an embodiment of the present invention, any one of an extension portion (37) provided in the top bridge (27), and extending toward the handle holder (40) from the top bridge (27), and an extension portion (237) provided in the handle holder (40), and extending toward the top bridge (227) from the handle holder (40), includes the fixing member (38, 138, 238) inserted into the extension portion (37, 237) and the adjustment hole (48a, 48b, 48c, 148, 248a, 248b, 248c).

According to an embodiment of the present invention, the fixing member is inserted into the extension portion extending toward the handle holder from the top bridge, or into the extension portion extending toward the top bridge from the handle holder. Thus, the fixing member is less recognizable, and the appearance of the vehicle is improved.

According to an embodiment of the present invention, the extension portion (37, 237) at least partially covers the adjustment hole (48a, 48b, 48c, 148, 248a, 248b, 248c).

According to an embodiment of the present invention, since the extension portion at least partially covers the adjustment hole, the adjusting hole can be hidden, and the appearance of the vehicle is improved.

According to an embodiment of the present invention, the extension portion (37, 237) abuts on a concave portion (47, 247) provided in any one of the handle holder (40) and the top bridge (227), and is fixed by the fixing member (38, 138, 238).

According to an embodiment of the present invention, the extension portion abuts on the concave portion provided in the handle holder or top bridge, and is fixed by the fixing member. Thus, protrusion of the extension portion can be reduced, so that the part can be downsized and the appearance of the vehicle can be improved.

According to an embodiment of the present invention, a scale (49a, 49b, 49c, 249a, 249b, 249c) for checking the position of the handle holder (40) is formed, in any one of the handle holder (40) and the top bridge (227).

According to an embodiment of the present invention, since the scale for checking the position of the handle holder is formed in the handle holder, the position of the handle holder can be adjusted accurately.

According to an embodiment of the present invention, a head portion (38a, 138a, 238a) of the fixing member (38, 138, 238) is directed toward an outer end portion (41a) in the vehicle width direction of a handle main body portion (41), which is supported to the handle holder (40).

According to an embodiment of the present invention, the head portion of the fixing member is directed toward the outer end portion in the vehicle width direction of the handle main body portion, which is supported to the handle holder. Thus, the fixing member can be fixed, from the side of the outer end portion in the vehicle width direction of the handle main body portion. Thus, the fixing member can be fixed easily, by utilizing the work space ensured by integrally steering the top bridge, the front fork, and the handle holder.

According to an embodiment of the present invention, the head portion (38*a*, 138*a*, 238*a*) of the fixing member (38, 138, 238) is buried in a recessed portion (52, 152, 252), which is formed in any one of the handle holder (40) and the top bridge (27).

According to an embodiment of the present invention, the head portion of the fixing member is buried in the recessed portion. Thus, the fixing member can be made less recognizable to improve the appearance. In addition, the recessed portion can keep rainwater from wetting the fixing member.

With the handle position-adjustment structure of a straddle type vehicle according to an embodiment of the present invention, bonding of the fixing member can be avoided to improve the maintainability. In addition, since the fixing member is less recognizable, the appearance of the vehicle can be improved.

According to an embodiment of the present invention, since the fixing member is inserted into the extension portion, the fixing member is less recognizable, and the appearance of the vehicle is improved.

According to an embodiment of the present invention, the extension portion can hide the adjustment hole. Thus, the appearance of the vehicle is improved.

According to an embodiment of the present invention, since the extension portion abuts on the concave portion, protrusion of the extension portion can be reduced, so that the part can be downsized and the appearance of the vehicle can be improved.

Furthermore, the position of the handle holder can be adjusted accurately by use of the scale.

According to an embodiment of the present invention, the fixing member can be fixed easily, from the side of the outer end portion in the vehicle width direction of the handle main body portion.

According to an embodiment of the present invention, the recessed portion can make the fixing member less recognizable, and can also keep rainwater from wetting the fixing member.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figure 1:
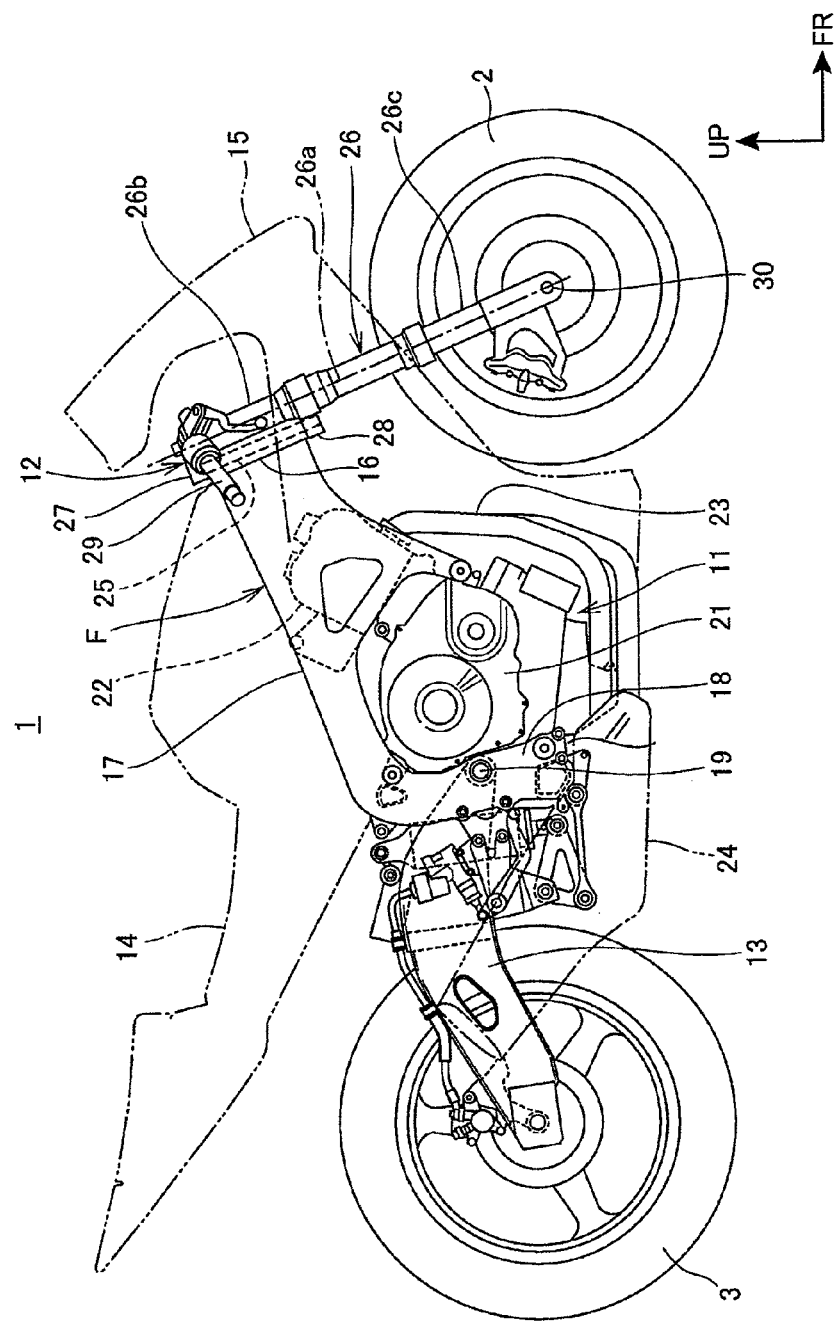
FIG. 1 is a right side view of a motorcycle including a handle position-adjustment structure, of a first embodiment of the present invention.

Hereinbelow, an embodiment of the present invention will be described with reference to the drawings. Note that in the description, directions such as the front and rear, right and left, and upper and lower are the same as those relative to the vehicle body, if not stated otherwise. Also, in the drawings, reference sign FR indicates the front of the vehicle body, reference sign UP indicates the upper direction of the vehicle body, and reference sign LH indicates the left of the vehicle body.

FIG. 1 is a right side view of a motorcycle 1 including a handle position-adjustment structure, of a first embodiment of the present invention. Of parts described as right and left pairs, left parts are not shown in FIG. 1.

The motorcycle 1 is a straddle type vehicle wherein an engine 11 is arranged in a longitudinal center part of a body frame F with a steering system 12 steerably supporting a front wheel 2 being supported to the front end of the body frame F. A swing arm 13 supporting a rear wheel 3 is provided on the rear side of the body frame F with a seat 14 on which a rider sits being provided above the body frame F. A resin body cover 15 covers parts of the body frame F and the engine 11.

The body frame F includes a head pipe 16 provided at the front end; a right and left pair of main frames 17, 17 extending obliquely downwardly to the rear from the head pipe 16 and a right and left pair of center frames 18, 18 extending downwardly from the rear ends of the main frames 17, 17.

The swing arm 13 is rotatably and pivotally supported by a pivot shaft 19, which is inserted into the center frames 18, 18 in the vehicle width direction, and the rear wheel 3 is pivotally supported to the rear end of the swing arm 13.

The engine 11 includes a crankcase 21 with a cylinder portion 22 extending upwardly from an upper face of a front part of the crankcase 21.

The engine 11 is fastened to an engine hanger (not shown) of the body frame F, and is supported in such a manner so as to hang down from the body frame F. The crankcase 21 is positioned below the main frames 17, 17, and in front of the center frames 18, 18.

An exhaust pipe 23 of the engine 11 is drawn downwardly from a front face of the cylinder portion 22, and extends rearwardly. An exhaust muffler 24 for noise reduction, which is arranged behind the engine 11, is connected to the rear end of the exhaust pipe 23.

Figure 2:
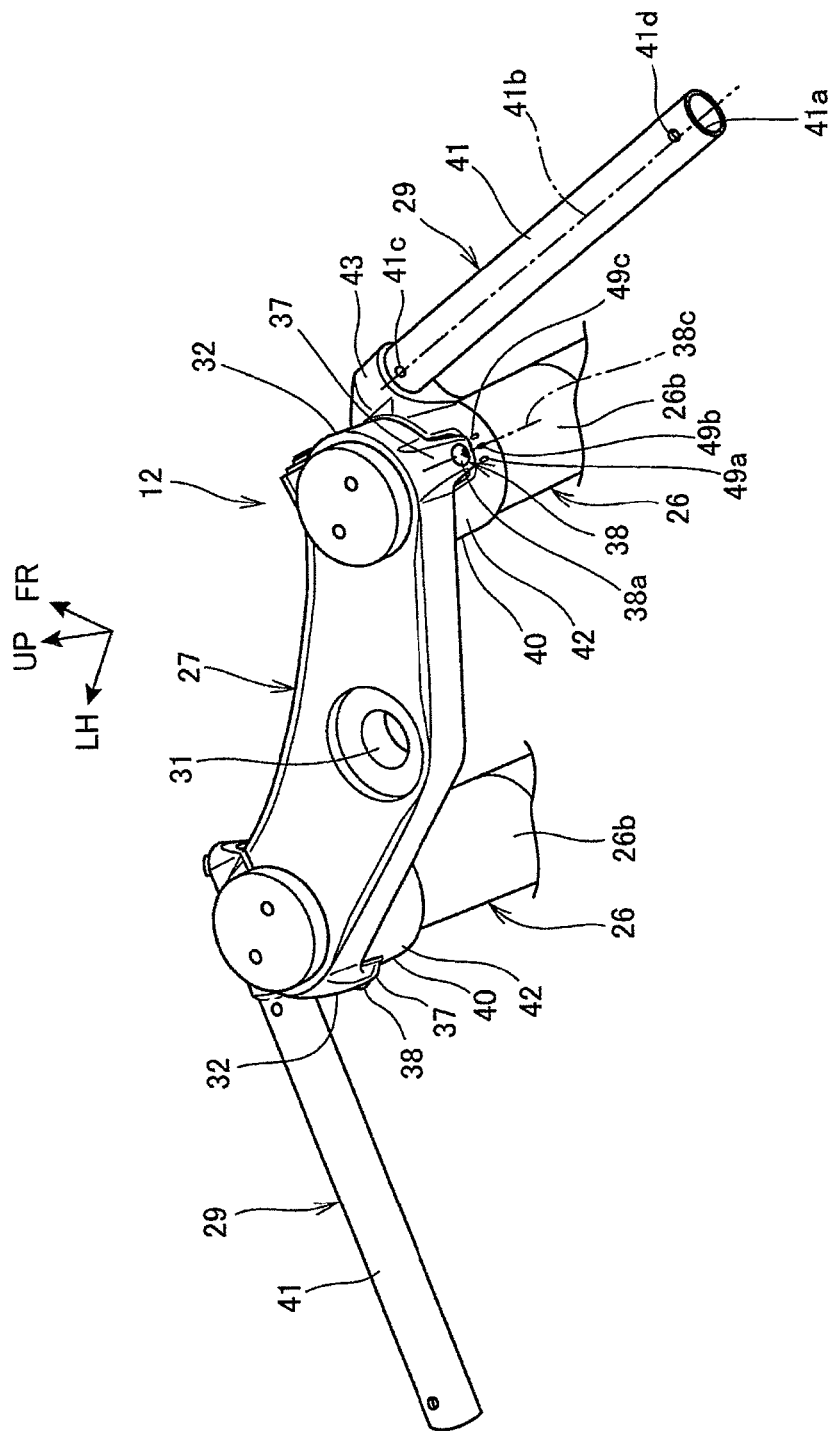
FIG. 2 is a perspective view of an upper part of a steering system.

FIG. 2 is a perspective view of an upper part of the steering system 12.

As shown in FIGS. 1 and 2, the steering system 12 includes a steering shaft 25 (FIG. 1) pivotally supported to the head pipe 16 in a rotatable manner; a right and left pair of front forks 26, 26 arranged on both right and left sides of the front wheel 2, and supporting the front wheel 2; a top bridge 27 fixed to the upper end of the steering shaft 25, and connecting the right and left front forks 26, 26; a bottom bridge 28 fixed to the lower end of the steering shaft 25, and connecting the right and left front forks 26, 26 and a right and left pair of handles 29, 29 fixed to upper parts of the front forks 26, 26.

The top bridge 27 is fixed to the upper end of the steering shaft 25 above the head pipe 16, while the bottom bridge 28 is fixed to the lower end of the steering shaft 25 below the head pipe 16.

Axes 26a, 26a of the front forks 26, 26 are tilted rearwardly relative to the vertical direction, for the caster angle set in the motorcycle 1. Also, the steering shaft 25 is arranged parallel to the axes 26a, 26a.

Each of the front forks 26, 26 includes an upper tube 26b supported to the top bridge 27 and the bottom bridge 28, and a lower tube 26c, which is axially movable in strokes with respect to the upper tube 26b.

The front wheel 2 is pivotally supported to a front wheel axle 30, which is bridged across lower end parts of the lower tubes 26c, 26c.

Figure 3:
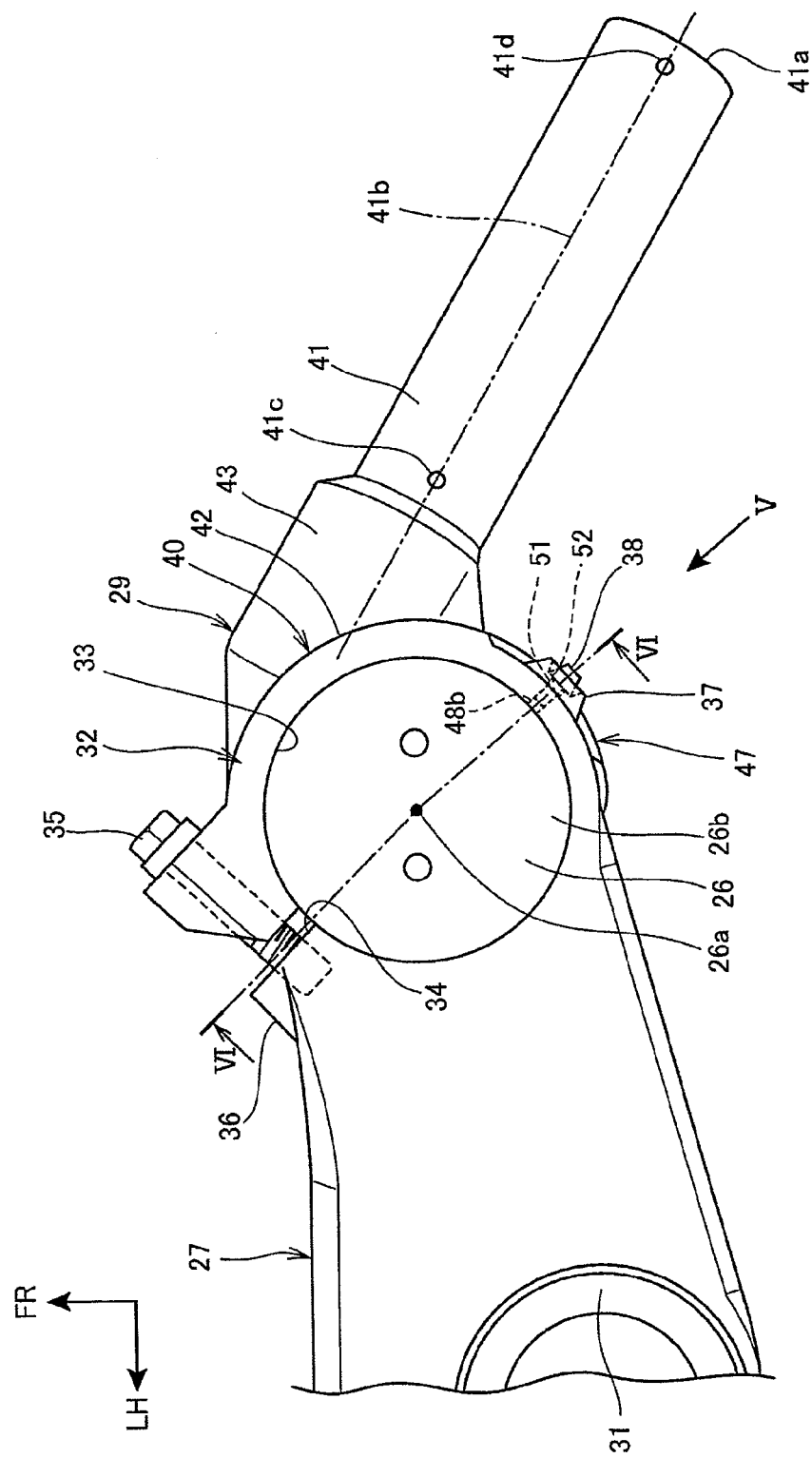
FIG. 3 shows the steering system as viewed from above, in the direction of an axis of a front fork.

FIG. 3 shows the steering system 12 as viewed from above, in the direction of the axis 26a of the front fork 26. Note that since the top bridge 27, the front forks 26, 26, and the handles 29, 29 are configured to be symmetrical with respect to the center in the vehicle width direction, the right parts thereof will be explained in detail in this description.

As shown in FIGS. 2 and 3, the top bridge 27 is a plate member extending in the vehicle width direction (lateral direction), and includes a shaft fixing hole 31 into which the steering shaft 25 is inserted and fixed, in its center part in the vehicle width direction.

The top bridge 27 also includes substantially cylindrical fork supporting portions 32, 32, which support the upper tubes 26b of the front forks 26, 26, in respective end parts in the vehicle width direction.

Each fork supporting portion 32 includes a fork insertion hole 33 (insertion hole) into which the front fork 26 is inserted; an open portion 34 where a part of the outer periphery of the fork supporting portion 32 is cut out in a slit shape; a split clamp bolt 35 tightened in such a direction as to reduce the size of the open portion 34 and a fastening portion 36 to which the split clamp bolt 35 is fastened.

The front fork 26 is fixed to the fork supporting portion 32 by a fastening force, which is generated by tightening the split clamp bolt 35 and reducing the diameter of the fork insertion hole 33.

The open portion 34, the split clamp bolt 35, and the fastening portion 36 are provided on the front face side of the top bridge 27.

The top bridge 27 also includes extension portions 37, 37 extending toward the handles 29, 29 side therebelow, from the outer periphery of the fork supporting portions 32, 32 on the rear face side.

Position adjustment bolts 38, 38 (fixing members), which are used for adjusting positions of the handles 29, are inserted into the extension portions 37, 37.

The bottom bridge 28 (FIG. 1) is a plate member extending in the vehicle width direction, and as in the case of the top bridge 27, includes a shaft fixing hole (not shown) into which the steering shaft 25 is inserted and fixed, and fork insertion holes (not shown) into which the front forks 26, 26 are inserted and fixed.

Figure 4:
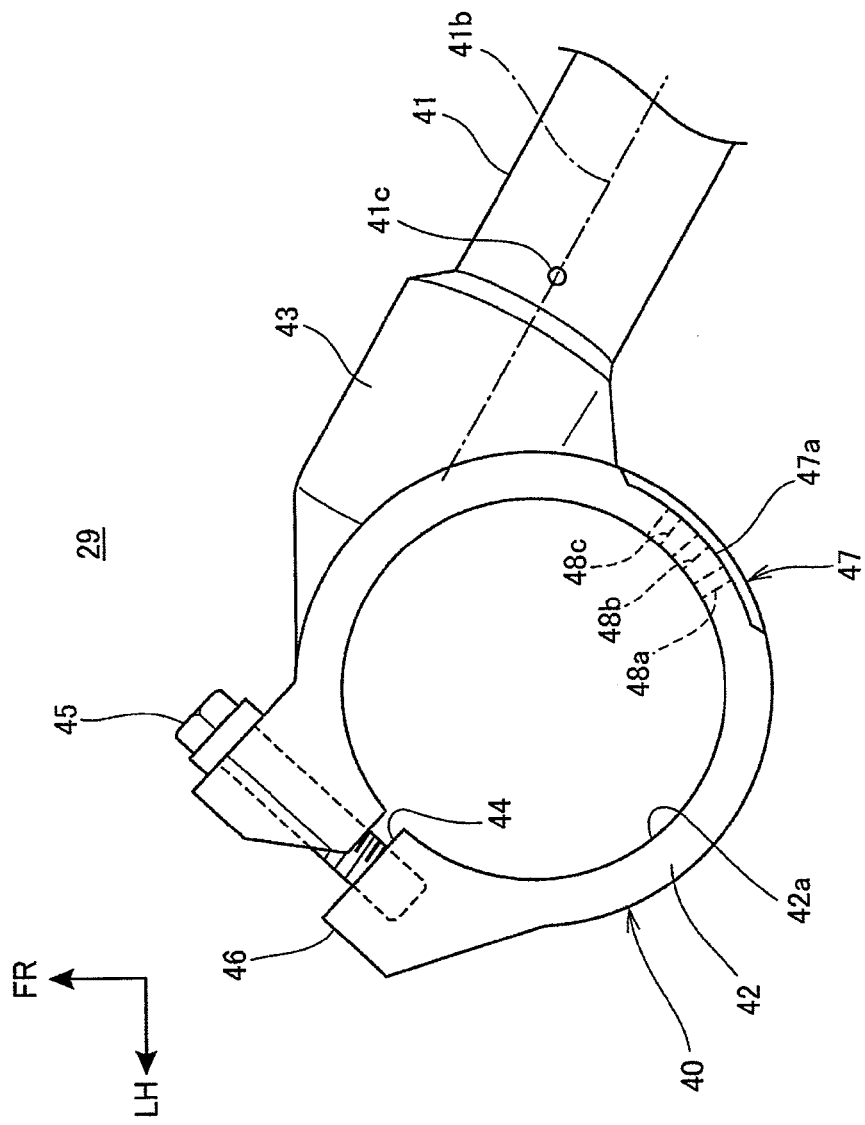
FIG. 4 shows a handle as viewed from above, in the direction of the axis of the front fork.

FIG. 4 shows the handle 29 as viewed from above, in the direction of the axis 26a of the front fork 26.

As shown in FIGS. 3 and 4, the handle 29 includes a handle holder 40 inserted into the outer periphery of the upper tube 26b of the front fork 26 to be fixed and a pipe-shaped handle main body portion 41 extending outwardly in the vehicle width direction from the handle holder 40. A cylindrical grip (not shown) gripped by the rider is attached to the handle main body portion 41. A box fixing hole 41c, to which a switch box (not shown) including a starter button and kill switch of the engine 11 and other switches is fixed, is formed in an inner end part of the handle main body portion 41 in the vehicle width direction. A bar end fixing hole 41d, to which a bar end member (not shown) provided on the outer end of the handle main body portion 41 is fixed, is formed in an outer end part of the handle main body portion 41 in the vehicle width direction.

The handles 29 are separate handles attached separately to the right and left front forks 26, 26, respectively.

The handle holder 40 is formed into a substantially cylindrical shape, and includes a cylinder portion 42 into which the front fork 26 is inserted; and a connection portion 43 protruding from an outer side face of the cylinder portion 42, and connected to a base end part of the handle main body portion 41. The inner periphery of the cylinder portion 42 is an insertion hole 42a, through which the front fork 26 is inserted. The handle holder 40 is arranged between the top bridge 27 and the bottom bridge 28. The handle main body portion 41 is formed separately from the handle holder 40, and is connected to the connection portion 43.

Also, the handle holder 40 includes an open portion 44 where a part of the outer periphery of the cylinder portion 42 is cut out in a slit shape; a split clamp bolt 45 tightened in such a direction as to reduce the size of the open portion 44 and a fastening portion 46 to which the split clamp bolt 45 is fastened.

The handle holder 40 is fixed to the outer periphery of the front fork 26 by a fastening force, which is generated by tightening the split clamp bolt 45 and reducing the diameter of the cylinder portion 42. When the fastening by the split clamp bolt 45 is loosened, the fastening force is released, so that the handle holder 40 can be rotated around the axis 26a of the front fork 26.

The open portion 44, the split clamp bolt 45, and the fastening portion 46 are provided on the front face side of the handle holder 40.

Figure 5:
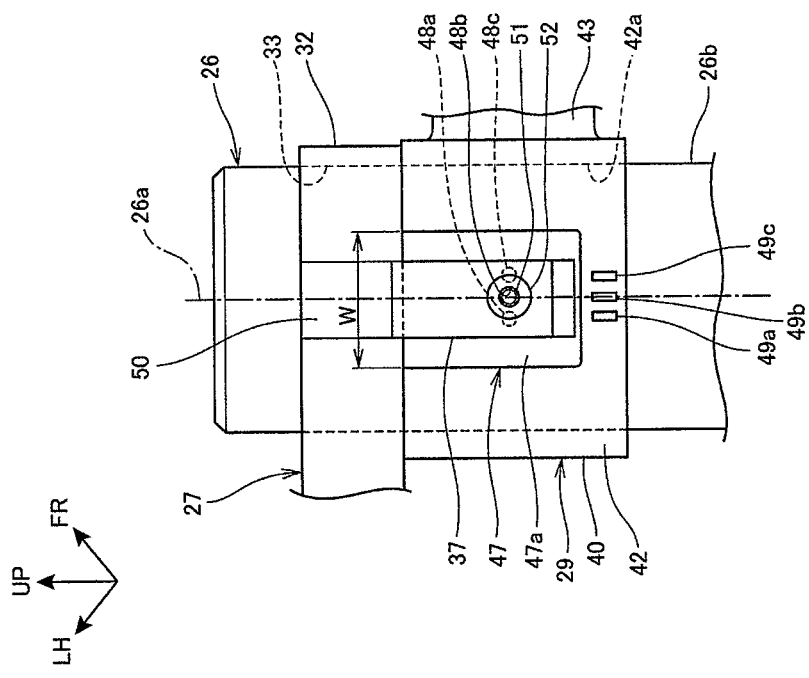
FIG. 5 is a view on arrow V of FIG. 3, showing the periphery of a handle holder from the rear side, in the axial direction of a position adjustment bolt.
Figure 6:
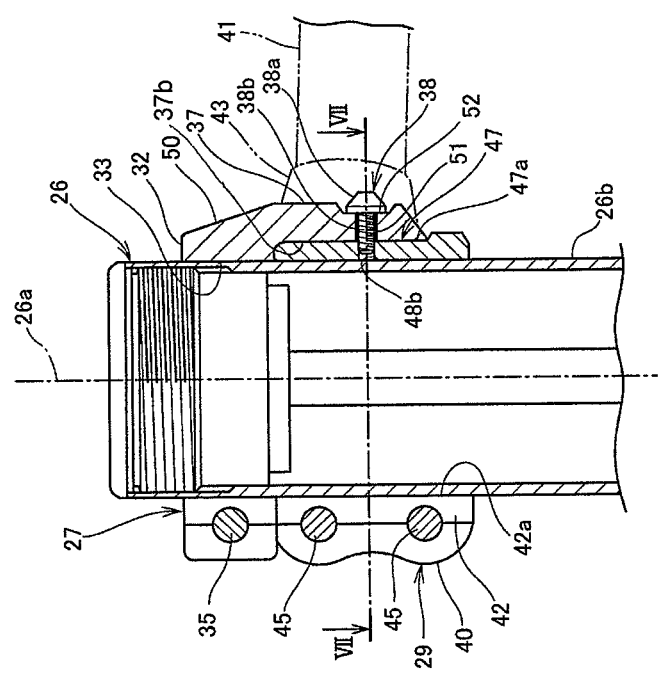
FIG. 6 is a cross-sectional view taken along VI-VI of FIG. 3.
Figure 7:
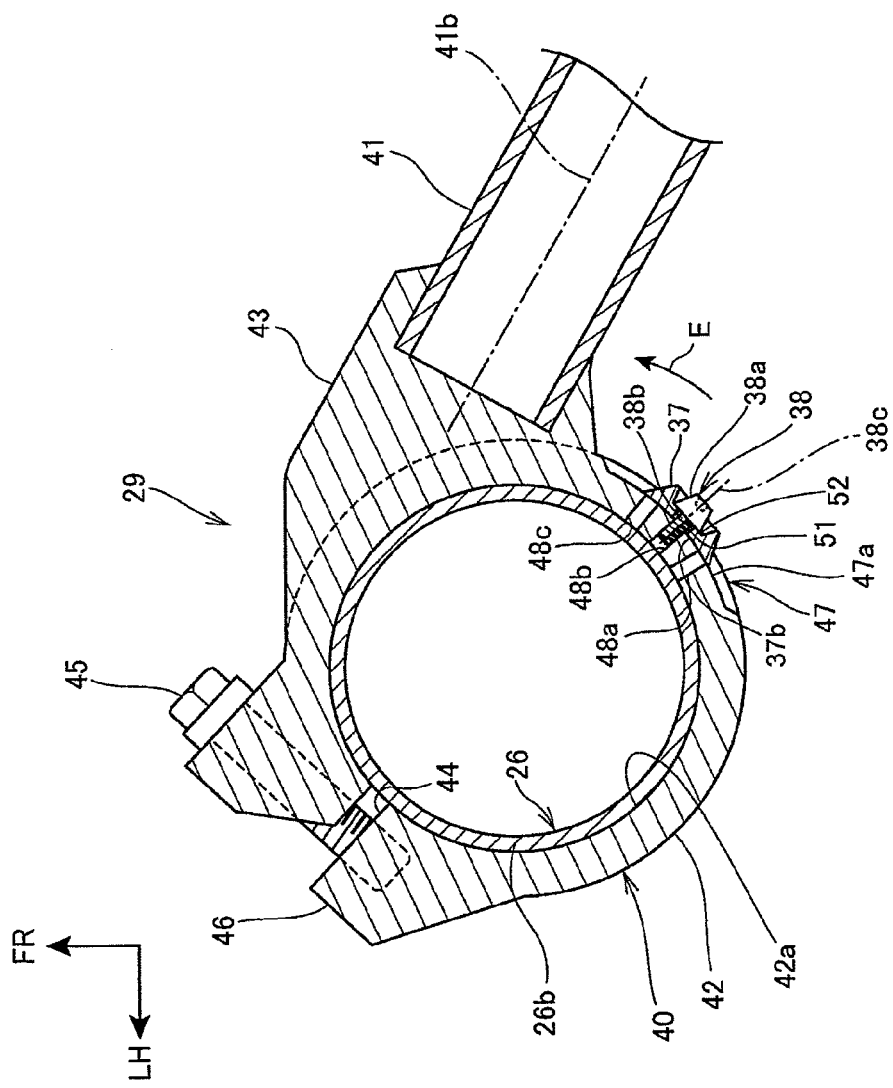
FIG. 7 is a cross-sectional view taken along VII-VII of FIG. 6.

FIG. 5 is a view on arrow V of FIG. 3, showing the periphery of the handle holder 40 from the rear side, in the axial direction of the position adjustment bolt 38. FIG. 6 is a cross-sectional view taken along VI-VI of FIG. 3. FIG. 7 is a cross-sectional view taken along VII-VII of FIG. 6. FIG. 5 shows a state where the position adjustment bolt 38 is detached.

Referring to FIGS. 3 to 7, the handle 29 is provided below the top bridge 27, such that the upper end of the handle holder 40 is adjacent to the lower end of the fork supporting portion 32 of the top bridge 27.

The cylinder portion 42 of the handle holder 40 includes a concave portion 47, which is formed as a step recessed in the radial direction from the outer periphery of the cylinder portion on the rear face side. The concave portion 47 is formed substantially rectangular in rear view, and extends from the upper end of the cylinder portion 42 to the vicinity of the lower end of the cylinder portion 42. Also, a width W of the concave portion 47 in the circumferential direction of the cylinder portion 42, is formed larger than the width of the extension portion 37 of the top bridge 27.

A bottom face of the concave portion 47 is a concave outer peripheral face 47a, which constitutes a part of the outer peripheral face of the cylinder portion 42. The concave outer peripheral face 47a is formed into a curved face, which follows the shape of an arc formed around the axis 26a of the front fork 26.

Multiple adjustment holes 48a, 48b, 48c, which are arranged side by side in the circumferential direction of the cylinder portion 42, are formed in the concave outer peripheral face 47a of the concave portion 47. The adjustment holes 48a, 48b, 48c are screw holes to which the position adjustment bolt 38 is fastened, and penetrate the cylinder portion 42.

The adjustment holes 48a, 48b, 48c are arranged at the same height positions, and are arranged at regular intervals in the circumferential direction. Also, the adjustment holes 48a, 48b, 48c are arranged in a vertical center part of the cylinder portion 42.

The center adjustment hole 48b is arranged at the center in the width direction of the concave portion 47, while the adjustment hole 48a and the adjustment hole 48c are respectively arranged on the left and right of the adjustment hole 48b.

The cylinder portion 42 includes scales 49a, 49b, 49c on its outer periphery below the adjustment holes 48a, 48b, 48c. The scales 49a, 49b, 49c are arranged to correspond to positions of the adjustment holes 48a, 48b, 48c in the circumferential direction, and are arranged directly below the adjustment holes 48a, 48b, 48c, respectively.

The top bridge 27 has a protrusion portion 50, which protrudes radially outwardly from the outer periphery of the cylindrical fork supporting portion 32. The extension portion 37 extends downwardly along the outer periphery of the cylinder portion 42 of the handle holder 40, from the lower end of the protrusion portion 50.

The extension portion 37 is inserted into the concave portion 47 in the direction of the axis 26a, from the upper end of the concave portion 47 of the cylinder portion 42. A rear face portion 37b of the extension portion 37 abuts on the concave outer peripheral face 47a. Since the extension portion 37 is thus arranged inside the concave portion 47, the extension portion 37 protrudes less toward the outer side of the front fork 26, and the part can be downsized.

The extension portion 37 includes a through hole 51 penetrating the extension portion 37 in the radial direction of the fork supporting portion 32, and the position adjustment bolt 38 is inserted into the through hole 51. The extension portion 37 includes a recessed portion 52, which is a step recessed from the outer periphery of the extension portion, around the through hole 51. A head portion 38a of the position adjustment bolt 38 is at least partially accommodated in the recessed portion 52. The recessed portion 52 is a spotfaced part, where a part of the outer face of the extension portion 37 is cut away.

The position adjustment bolt 38 is inserted into the through hole 51 in the extension portion 37, and a shaft portion 38b as a screw part is fastened to one of the adjustment holes 48a, 48b, 48c in the handle holder 40. More specifically, the position adjustment bolt 38 is fastened, in such a manner as to be oriented in a direction perpendicular to the axis 26a of the front fork 26. The shaft portion 38b is formed short, so as not to abut on the outer periphery of the front fork 26 when fastened.

Hereinafter, an example of the procedure of adjusting the position of the handle 29 will be described, with reference to FIGS. 5, 7, and 8.

Figure 8:
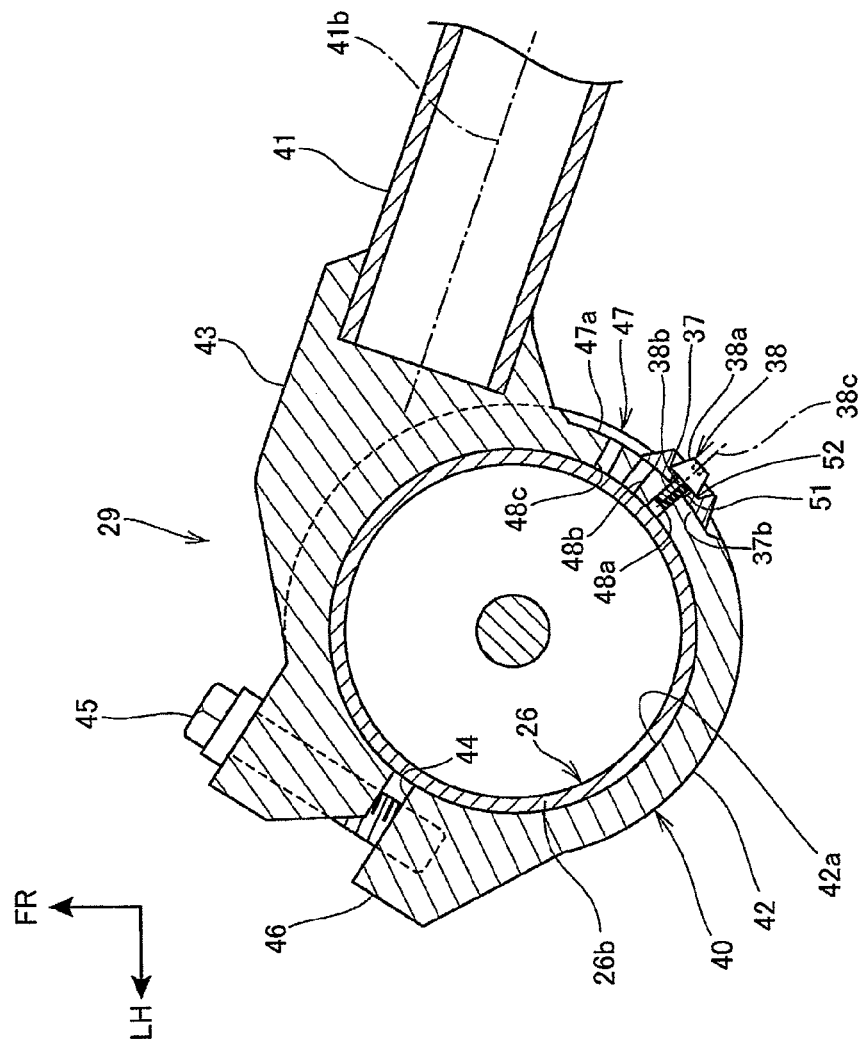
FIG. 8 is a cross-sectional view of a state where the handle position is adjusted toward the outer direction, from the state in FIG. 7.

FIG. 8 is a cross-sectional view of a state where the position of the handle 29 is adjusted toward the outer direction, from the state in FIG. 7.

First, in the state of FIG. 7, the position adjustment bolt 38 is detached from the adjustment hole 48b and the extension portion 37, while the fastening of the split clamp bolt 45 of the handle holder 40 is loosened. This allows the handle holder 40 to rotate around the axis 26a of the front fork 26.

The handle holder 40 is rotated in a desired rotation direction E (outer direction in the embodiment) indicated by an arrow, and the handle holder 40 is set such that the adjustment hole 48a is aligned with the position of the through hole 51, as in FIG. 8. At this time, the position can be easily aligned, by rotating the handle holder 40 such that the scale 49a is positioned below the through hole 51.

The position adjustment bolt 38 is inserted into the through hole 51 and fastened to the adjustment hole 48a, whereby the position of the handle holder 40 around the axis 26a is adjusted accurately. Thereafter, the handle 29 is fixed to the front fork 26 by fastening the split clamp bolt 45. This adjustment opens the handle main body portion 41 farther toward the outer side than before the adjustment. Also as shown in FIG. 8, after the adjustment, the adjustment holes 48a, 48b, 48c are moved in the circumferential direction relative to the extension portion 37, so that the adjustment hole 48c is no longer covered with the extension portion 37, and is exposed to the outside.

In addition, when the position adjustment bolt 38 is fastened to the adjustment hole 48c from the through hole 51, the handle main body portion 41 moves toward the inner side.

As shown in FIGS. 2 and 7, an axis 38c of the head portion 38a of the position adjustment bolt 38, is directed toward an outer end portion 41a in the vehicle width direction of the handle main body portion 41. Thus, it is possible to fix the position adjustment bolt 38 by working from the side of the outer end portion 41a in the vehicle width direction. By steering the steering system 12, it is possible to work while ensuring a wide work space between the handle main body portion 41 and the vehicle body. Thus, the maintenance can be facilitated.

The axis 38c of the head portion 38a of the position adjustment bolt 38 is substantially parallel to a handle axis 41b of the handle main body portion 41. More specifically, the axis 38c is oriented such that it separates from the handle axis 41b, toward the outer side in the vehicle width direction. Thus, when attaching and detaching the position adjustment bolt 38, a distance can be ensured between the work space and parts such as the aforementioned grip provided in the handle main body portion 41, and the work can be facilitated.

In the embodiment, the position adjustment bolt 38 is fastened to the adjustment holes 48a, 48b, 48c from the side face side of the front fork 26, in such a manner as to be oriented in a direction perpendicular to the axis 26a of the front fork 26. Thus, the adjustment holes 48a, 48b, 48c and the through hole 51 of the top bridge 27 are positioned not on the upper face side of the top bridge 27, but on the side face side thereof. Thus, rainwater from above is less likely to enter the through hole 51 and the adjustment holes 48a, 48b, 48c, whereby bonding of the position adjustment bolt 38 can be avoided. This facilitates maintenance. Also, the upper face side of the top bridge 27 is easily recognizable by the rider riding while gripping the handle 29, but the side face side of the top bridge 27 is not easily recognizable by the rider when he/she looks down on the steering system 12. Thus, the position adjustment bolt 38 is not highly visible to the rider, and appearance of the motorcycle 1 is improved.

Also, the position adjustment bolt 38 is provided on a rear face part overhanging on the rear face side of the steering system 12, which is tilted rearwardly along with the inclination of the front fork 26. Accordingly, the position adjustment bolt is less likely to be directly wetted by rainwater, and is less recognizable from the outside. Thus, bonding of the position adjustment bolt 38 can be avoided, and the appearance can be improved.

Also, the extension portion 37 covers and hides the adjustment holes 48a, 48b, 48c from outside. Thus, the adjustment holes 48a, 48b, 48c can be made inconspicuous, and an excellent appearance can be achieved.

As has been described, according to the first embodiment to which the present invention is applied, the motorcycle 1 includes the right and left pair of front forks 26, 26 arranged on both sides of the front wheel 2 for supporting the front wheel 2. The top bridge 27 includes the fork insertion holes 33, 33 into which the right and left pair of front forks 26, 26 are inserted for connecting the right and left pair of front forks 26, 26 with each other. The right and left pair of handle holders 40, 40 are arranged below the fork insertion holes 33, 33, and have the cylinder portion 42 inserted into each of the front forks 26, 26 in such a manner so as to be rotatable around the axis 26a of the front forks 26, 26. The adjustment holes 48a, 48b, 48c allow adjustment of the positions of the handle holders 40, 40. The position of the handle holders 40, 40 is adjustable by the position adjustment bolt 38, which is inserted into the adjustment holes 48a, 48b, 48c and the top bridge 27 and the position adjustment bolt 38 is oriented in a direction perpendicular to the axis 26a of the front forks 26, 26. Since the position adjustment bolt 38 is oriented not in the direction of the axis 26a, but in the direction perpendicular to the axis 26a, rainwater is less likely to enter the adjustment holes 48a, 48b, 48c into which the position adjustment bolt 38 is inserted. Thus, bonding of the position adjustment bolt 38 can be avoided, and maintainability can be improved. In additional, since the position adjustment bolt 38 is oriented in a direction perpendicular to the axis 26a of the front forks 26, 26, and is less recognizable, the appearance of the vehicle can be improved.

The motorcycle includes the extension portions 37, 37 provided in the top bridge 27, and extending toward the handle holders 40, 40 from the top bridge 27. The position adjustment bolts 38 are inserted into the extension portions 37, 37 and the adjustment holes 48a, 48b, 48c. The position adjustment bolts 38 are inserted into the extension portions 37, 37 extending toward the handle holders 40, 40 from the top bridge 27. Thus, the position adjustment bolts 38 are less recognizable, and the appearance of the motorcycle 1 is improved.

The extension portions 37, 37 cover at least some of the adjustment holes 48a, 48b, 48c. More specifically, the extension portion 37 covers all of the adjustment holes 48a, 48b, 48c in FIG. 7, and even when the handle holder 40 is rotated as in FIG. 8, the extension portion 37 covers the adjustment holes 48a, 48b. Thus, the extension portion 37 can hide at least some of the adjustment holes 48a, 48b, 48c, and the appearance of the motorcycle 1 can be improved.

Moreover, since the scales 49a, 49b, 49c for checking the positions of the handle holders 40, 40 are formed in the handle holders 40, 40, the positions of the handle holders 40, 40 can be adjusted accurately.

The head portion 38a of the position adjustment bolt 38 is directed toward the outer end portion 41a in the vehicle width direction, of the handle main body portion 41 supported to each of the handle holders 40, 40. With this, the position adjustment bolt 38 can be fixed, from the side of the outer end portion 41a in the vehicle width direction of the handle main body portion 41. Thus, the adjustment bolt 38 can be fixed easily, by utilizing the work space ensured by integrally steering the top bridge 27, the front forks 26, 26, and the handle holders 40, 40.

The extension portions 37, 37 abut on the concave portions 47 provided in the handle holders 40, 40, and are fixed by the position adjustment bolts 38. Thus, protrusion of the extension portions 37, 37 can be reduced, so that the parts can be downsized and the appearance of the motorcycle 1 can be improved.

The head portion 38a of the position adjustment bolt 38 is buried in the recessed portion 52 of the top bridge 27. Thus, the position adjustment bolt 38 can be made less recognizable to improve the appearance, and also the recessed portion 52 can keep rainwater from wetting the position adjustment bolt 38.

Hereinbelow, a second embodiment to which the present invention is applied will be described, with reference to FIGS. 9 and 10. In the second embodiment, parts configured similar to those in the aforementioned first embodiment are assigned the same reference numerals, and descriptions thereof will be omitted.

The second embodiment is different from the aforementioned first embodiment, in that the fixing member is a pin 138 (fixing member), and that the position of a handle holder 40 is adjusted by inserting the pin 138 into an adjustment hole 148, which is formed into a long hole.

Figure 9:
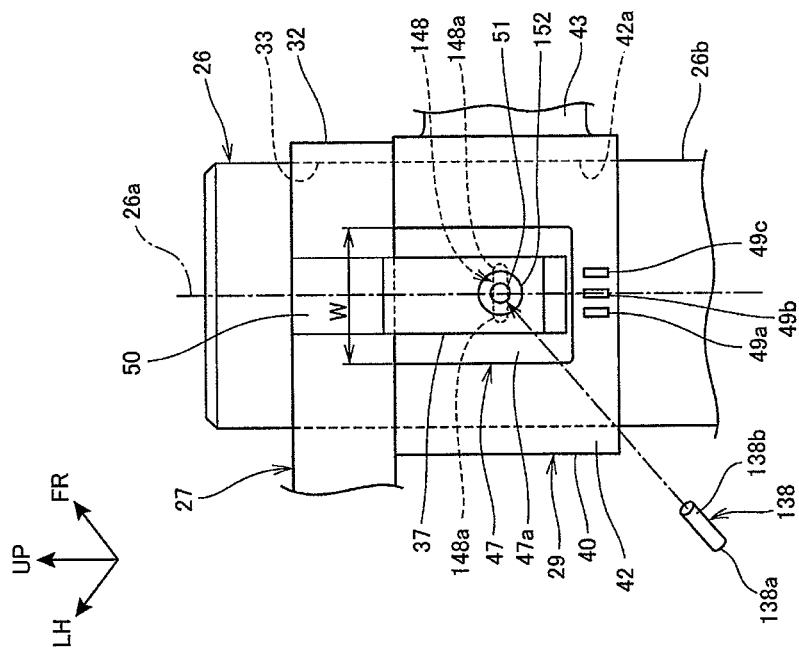
FIG. 9 shows the periphery of a handle holder corresponding to FIG. 5, as viewed from the rear side in the axial direction of a pin, in a second embodiment.
Figure 10:
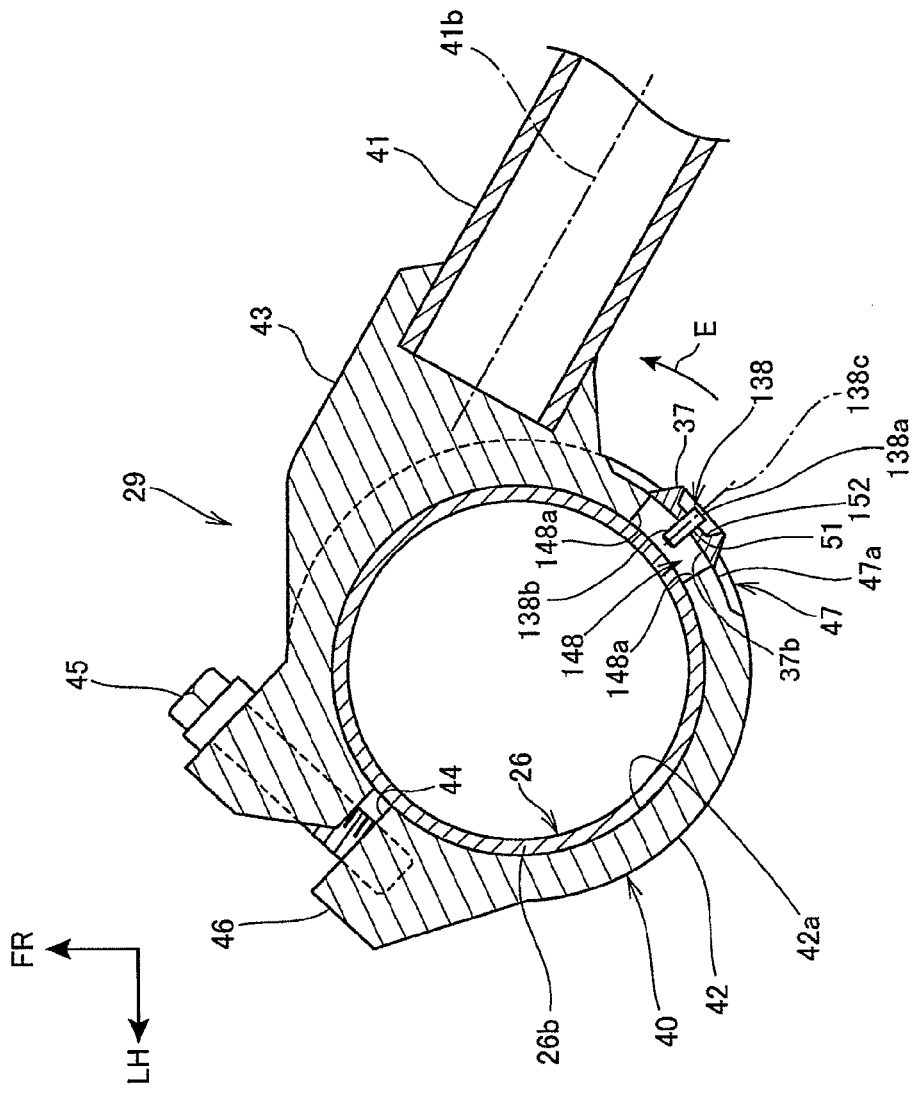
FIG. 10 is a cross-sectional view taken along VII-VII, corresponding to the second embodiment.

FIG. 9 shows the periphery of the handle holder 40 corresponding to FIG. 5, as viewed from the rear side in the axial direction of the pin 138, in the second embodiment. FIG. 10 is a cross-sectional view taken along VII-VII, corresponding to the second embodiment.

In place of the adjustment holes 48a, 48b, 48c of the aforementioned first embodiment, the handle holder 40 includes the adjustment hole 148 formed into a long hole in a concave portion 47. The adjustment hole 148 is a through hole, which extends straight in the circumferential direction of a cylinder portion 42.

An extension portion 37 of a top bridge 27 includes a recessed portion 152, which is a step recessed from the outer periphery of the extension portion, around a through hole 51. The recessed portion 152 is a spotfaced part, where a part of the outer face of the extension portion 37 is cut away.

The pin 138 inserted from the through hole 51, is inserted into the adjustment hole 148 in the concave portion 47.

The pin 138 includes a head portion 138a, which is at least partially accommodated in the recessed portion 152 and a fitting portion 138b, which is fitted into the inner periphery of the adjustment hole 148 in the vertical direction. The head portion 138a may have a larger diameter than the fitting portion 138b.

The pin 138 is inserted into the through hole 51, in such a manner so as to be oriented in a direction perpendicular to an axis 26a of a front fork 26. Also, an axis 138c of the pin 138 is directed toward an outer end portion 41a (FIG. 3) in the vehicle width direction of a handle main body portion 41.

When adjusting the position of the handle holder 40, after inserting the pin 138 is into the through hole 51 and the adjustment hole 148, the handle holder 40 can be positioned by pressing a side face of a tip end part of the fitting portion 138b of the pin 138, against an end portion 148a of the adjustment hole 148 in the longitudinal direction, for example. Also, the pin 138 can be fixed to an arbitrary position inside the adjustment hole 148, by friction between the outer peripheral face of the pin and the inner periphery of the adjustment hole 148. Scales 49a, 49b, 49c may be used as guides when adjusting the position.

Hereinbelow, a third embodiment to which the present invention is applied will be described, with reference to FIG. 11. In the third embodiment, parts configured similar to those in the aforementioned first embodiment are assigned the same reference numerals, and descriptions thereof will be omitted.

In the third embodiment, a description will be given of a configuration in which an extension portion 237 is provided in a handle holder 40, and adjustment holes 248a, 248b, 248c are provided in a top bridge 227.

Figure 11:
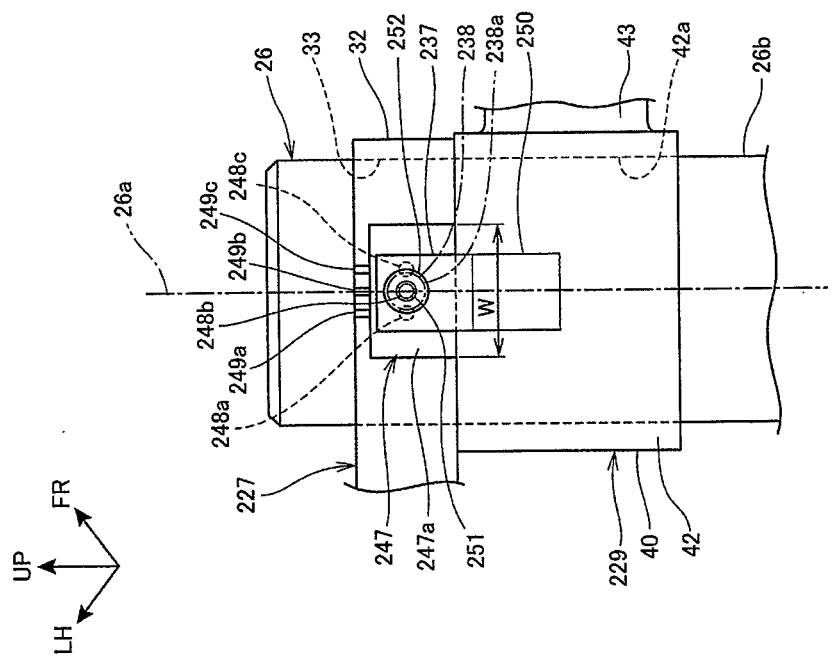
FIG. 11 shows the periphery of a handle holder corresponding to FIG. 5, as viewed from the rear side in the axial direction of a position adjustment bolt, in a third embodiment.

FIG. 11 shows the periphery of the handle holder 40 corresponding to FIG. 5, as viewed from the rear side in the axial direction of a position adjustment bolt 238, in the third embodiment. The position adjustment bolt 238 is indicated by a virtual line in FIG. 11.

The top bridge 227 includes a fork supporting portion 32. A concave portion 247, which is formed as a step recessed in the radial direction from the outer periphery of the top bridge, is formed on a rear face of the fork supporting portion 32. The concave portion 247 is substantially rectangular in rear view, and extends from the lower end of the fork supporting portion 32 to the vicinity of the upper end of the fork supporting portion 32. Also, a width W of the concave portion 247 in the circumferential direction of the fork supporting portion 32, is formed larger than the width of the extension portion 237 of the handle holder 40.

A bottom face of the concave portion 247 is a concave outer peripheral face 247a, which constitutes a part of the outer peripheral face of the fork supporting portion 32. The concave outer peripheral face 247a is formed into a curved face, which follows the shape of an arc formed around an axis 26a of a front fork 26.

Multiple adjustment holes 248a, 248b, 248c, which are arranged side by side in the circumferential direction of the fork supporting portion 32, are formed in the concave outer peripheral face 247a of the concave portion 247. The adjustment holes 248a, 248b, 248c are screw holes to which the position adjustment bolt 238 formed in the same manner as in the aforementioned first embodiment is fastened, and penetrate the fork supporting portion 32. The position adjustment bolt 238 includes a head portion 238a and a shaft portion 238b.

The adjustment holes 248a, 248b, 248c are arranged at the same height positions, and are arranged at regular intervals in the circumferential direction.

The fork supporting portion 32 includes scales 249a, 249b, 249c on its outer periphery above the adjustment holes 248a, 248b, 248c. The scales 249a, 249b, 249c are arranged to correspond to positions of the adjustment holes 248a, 248b, 248c in the circumferential direction, and are arranged directly above the adjustment holes 248a, 248b, 248c, respectively.

A handle 229 includes the handle holder 40. The handle 229 has a protrusion portion 250, which protrudes radially outwardly from the outer periphery of the handle holder 40. The extension portion 237 extends upwardly along the outer periphery of the fork supporting portion 32, from the upper end of the protrusion portion 250. More specifically, the extension portion 237 is provided in the handle holder 40, and extends toward the top bridge 227 from the handle holder 40.

The extension portion 237 is inserted into the concave portion 247 in the direction of the axis 26a, from the lower end of the concave portion 247. A rear face portion (not shown) of the extension portion 237 abuts on the concave outer peripheral face 247a. Since the extension portion 237 is thus arranged inside the concave portion 247, the extension portion 237 protrudes less toward the outer side of the front fork 26, and the part can be downsized.

The extension portion 237 includes a through hole 251 penetrating the extension portion 237 in the radial direction of the handle holder 40, and the position adjustment bolt 238 is inserted into the through hole 251. The extension portion 237 includes a recessed portion 252 on its outer periphery, around the through hole 251. The head portion 238a of the position adjustment bolt 238 is at least partially accommodated in the recessed portion 252.

The position adjustment bolt 238 is inserted into the through hole 251 in the extension portion 237, and the shaft portion 238b (see FIG. 6) is fastened to one of the adjustment holes 248a, 248b, 248c in the top bridge 227. More specifically, the position adjustment bolt 238 is fastened, in such a manner so as to be oriented in a direction perpendicular to the axis 26a of the front fork 26.

The extension portion 237 covers and hides at least some of the adjustment holes 248a, 248b, 248c.

Hereinafter, an example of the procedure of adjusting the position of the handle 229 will be described.

First, the position adjustment bolt 238 is detached from the adjustment hole 248b and the extension portion 237, while the fastening of a split clamp bolt 45 (see FIG. 4) of the handle holder 40 is loosened.

Next, the handle holder 40 is rotated in a desired rotation direction (outer direction in the embodiment), and the handle holder 40 is set such that the through hole 251 is aligned with the position of the adjustment hole 248c.

Next, the position adjustment bolt 238 is inserted into the through hole 251 and fastened to the adjustment hole 248c, whereby the position of the handle holder 40 around the axis 26a is adjusted accurately. Lastly, the handle 229 is fixed to the front fork 26 by fastening the split clamp bolt 45.

Note that the above first to third embodiments show an aspect to which the present invention is applied, and the invention is not limited to the embodiments.

Although the above first to third embodiments have been described under the assumption that the handle main body portion 41 is formed separately from the handle holder 40, and is connected to the connection portion 43, the invention is not limited to this. The handle main body portion 41 may be provided integrally with the handle holder 40. Also, although the handle holder is provided below the top bridge in the above first to third embodiments, the invention is not limited to this. The handle holder may be provided above the top bridge in other configurations. In this case, for example, a handle holder is rotatably fitted to an upper end part of a front fork protruding upward from an upper face of a top bridge, and an extension portion extends from the top bridge to a concave part in the handle holder provided thereabove. The handle is positioned by fastening a position adjustment bolt, which is inserted into the extension portion, to an adjustment hole in the handle holder.

Although the above first to third embodiments have been described by using the motorcycle 1 as an example of the straddle type vehicle, the invention is not limited to this. For example, the invention may be applied to a straddle type vehicle having three or more wheels.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A handle position-adjustment structure of a straddle vehicle comprising:
    a right and left pair of front forks arranged on both sides of a front wheel for supporting the front wheel;
    a top bridge including insertion holes into which the right and left pair of said front forks are inserted, and connecting the right and left pair of said front forks with each other;
    a right and left pair of handle holders arranged above or below said insertion holes, and having a cylinder portion inserted into said front fork in such a manner so as to be rotatable around an axis of said front fork; and
    an adjustment hole allowing adjustment of a position of the handle holder;
    wherein:
        the position of said handle holder is adjustable by a fixing member inserted into said adjustment hole and one of said top bridge and said handle holder;
        said fixing member is oriented in a direction perpendicular to said axis of said front fork;
        an extension portion is provided in said top bridge, and extends toward said handle holder from the top bridge, and
        said fixing member is inserted into said extension portion and said adjustment hole.

2. The handle position-adjustment structure of a straddle vehicle according to claim 1, wherein said extension portion at least partially covers said adjustment hole.

3. The handle position-adjustment structure of a straddle vehicle according to claim 1, wherein said extension portion abuts on a concave portion provided in said handle holder, and is fixed by said fixing member.

4. The handle position-adjustment structure of a straddle vehicle according to claim 1, wherein a scale for checking the position of said handle holder is in the handle holder.

5. The handle position-adjustment structure of a straddle vehicle according to claim 2, wherein a scale for checking the position of said handle holder is formed in the handle holder.

6. The handle position-adjustment structure of a straddle vehicle according to claim 3, wherein a scale for checking the position of said handle holder is formed in the handle holder.

7. The handle position-adjustment structure of a straddle vehicle according to claim 1, wherein a head portion of said fixing member is directed toward an outer end portion in a vehicle width direction of a handle main body portion, which is supported to said handle holder.

8. The handle position-adjustment structure of a straddle vehicle according to claim 1, wherein a head portion of said fixing member is buried in a recessed portion, which is formed in said handle holder.

9. A handle position-adjustment structure of a straddle vehicle comprising:
    a right and left pair of front forks;
    a top bridge including insertion holes into which the right and left pair of said front forks are inserted for connecting the right and left pair of said front forks with each other;
    a right and left pair of handle holders arranged above or below said insertion holes, and having a cylinder portion inserted into said front fork in such a manner so as to be rotatable around an axis of said front fork; and
    an adjustment hole allowing adjustment of a position of the handle holder;
    wherein:
        the position of said handle holder is adjustable by a fixing member inserted into said adjustment hole and one of said top bridge and said handle holder;
        said fixing member is oriented in a direction perpendicular to said axis of said front fork;
        an extension portion is provided in said top bridge, and extends toward said handle holder from the top bridge, and
        said fixing member is inserted into said extension portion and said adjustment hole.

10. The handle position-adjustment structure of a straddle vehicle according to claim 9, wherein said extension portion at least partially covers said adjustment hole.

11. The handle position-adjustment structure of a straddle vehicle according to claim 9, wherein said extension portion abuts on a concave portion provided in said handle holder, and is fixed by said fixing member.

12. The handle position-adjustment structure of a straddle vehicle according to claim 9, wherein a scale for checking the position of said handle holder is formed in the handle holder.

13. The handle position-adjustment structure of a straddle vehicle according to claim 9, wherein a head portion of said fixing member is directed toward an outer end portion in a vehicle width direction of a handle main body portion, which is supported to said handle holder.

14. The handle position-adjustment structure of a straddle vehicle according to claim 9, wherein a head portion of said fixing member is buried in a recessed portion, which is formed in said handle holder.

15. A handle position-adjustment structure of a straddle vehicle comprising:
    a right and left pair of front forks arranged on both sides of a front wheel for supporting the front wheel;
    a top bridge including insertion holes into which the right and left pair of said front forks are inserted, and connecting the right and left pair of said front forks with each other;
    a right and left pair of handle holders arranged above or below said insertion holes, and having a cylinder portion inserted into said front fork in such a manner so as to be rotatable around an axis of said front fork; and
    an adjustment hole allowing adjustment of a position of the handle holder;
    wherein:
        the position of said handle holder is adjustable by a fixing member inserted into said adjustment hole and one of said top bridge and said handle holder;
        said fixing member is oriented in a direction perpendicular to said axis of said front fork;
        an extension portion is provided in said handle holder, and extends toward said top bridge from the handle holder, and said fixing member is inserted into said extension portion and said adjustment hole.

16. The handle position-adjustment structure of a straddle vehicle according to claim 15, wherein said extension portion abuts on a concave portion provided said top bridge, and is fixed by said fixing member.

17. The handle position-adjustment structure of a straddle vehicle according to claim 15, wherein a scale for checking the position of said handle holder is formed in said top bridge.

18. The handle position-adjustment structure of a straddle vehicle according to claim 15, wherein a head portion of said fixing member is directed toward an outer end portion in a vehicle width direction of a handle main body portion, which is supported to said handle holder.

19. The handle position-adjustment structure of a straddle vehicle according to claim 15, wherein a head portion of said fixing member is buried in a recessed portion, which is formed in said top bridge.

* * * * *